(12) United States Patent
Alwar

(10) Patent No.: US 8,856,889 B2
(45) Date of Patent: Oct. 7, 2014

(54) METHODS AND SYSTEMS FOR GENERATION OF AUTHORIZED VIRTUAL APPLIANCES

(75) Inventor: ArulMurugan Alwar, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 33 days.

(21) Appl. No.: 13/821,438

(22) PCT Filed: Oct. 19, 2010

(86) PCT No.: PCT/US2010/053122
§ 371 (c)(1),
(2), (4) Date: Mar. 7, 2013

(87) PCT Pub. No.: WO2012/054016
PCT Pub. Date: Apr. 26, 2012

(65) Prior Publication Data
US 2013/0276068 A1    Oct. 17, 2013

(51) Int. Cl.
*G06F 7/04* (2006.01)
*H04L 29/06* (2006.01)
*G06F 9/50* (2006.01)
*G06F 21/53* (2013.01)
*G06F 9/445* (2006.01)

(52) U.S. Cl.
CPC .............. *H04L 63/10* (2013.01); *G06F 9/5077* (2013.01); *G06F 8/63* (2013.01); *G06F 21/53* (2013.01)
USPC .......................................................... 726/4

(58) Field of Classification Search
CPC ......... H04L 63/10; G06F 9/5077; G06F 8/63; G06F 21/53
USPC .......................................................... 726/4
See application file for complete search history.

(56) References Cited

U.S. PATENT DOCUMENTS

| 8,627,274 | B2 * | 1/2014 | Peraza et al. .................. 717/104 |
| 2008/0098465 | A1 | 4/2008 | Ramakrishna et al. |
| 2008/0215796 | A1 * | 9/2008 | Lam et al. ...................... 711/100 |
| 2009/0217263 | A1 * | 8/2009 | Gebhart et al. ................... 718/1 |
| 2009/0249329 | A1 | 10/2009 | Dash |
| 2010/0235482 | A1 * | 9/2010 | Chalupa et al. ............... 709/222 |
| 2010/0257602 | A1 | 10/2010 | Kettler et al. |
| 2011/0004676 | A1 * | 1/2011 | Kawato ......................... 709/221 |

OTHER PUBLICATIONS

International Preliminary Report on Patentability, May 2, 2013, The International Bureau of WIPO. PCT Patent Application No. PCT/US2010/053122, Filed Oct. 19, 2010.

(Continued)

*Primary Examiner* — Teshome Hailu
(74) *Attorney, Agent, or Firm* — Benjamin M. Searle

(57) ABSTRACT

In one embodiment, a virtual appliance generation system receives from a client via a communications link a selection identifier associated with a capability of a virtual appliance module, accesses an authorization value associated with the capability of the virtual appliance module in response to the receiving, and stores an identifier of the capability of the virtual appliance module within a virtual appliance descriptor. The authorization value is also stored within the virtual appliance descriptor. A digest based on the virtual appliance descriptor is generated and a virtual appliance container including a portion of the virtual appliance module, the virtual appliance descriptor, and the digest is generated. The virtual appliance generation system then provides the virtual appliance container to the client.

20 Claims, 8 Drawing Sheets

(56) References Cited

OTHER PUBLICATIONS

Galan, Fermin, et al. "Service specification in cloud environments based on extensions to open standards." Proceedings of the fourth international ICST conference on communication system software and middleware. ACM, 2009.

International Search Report and Written Opinion, Dated Jun. 29, 2011, PCT Application No. PCT/US2010/053122, Filed 19 Oct. 2010.

Konstantinou, Alexander V., et al. "An architecture for virtual solution composition and deployment in infrastructure clouds." Proceedings of the 3rd international workshop on Virtualization technologies in distributed computing. ACM, 2009.

Matthews, Jeanna, et al. "Virtual machine contracts for datacenter and cloud computing environments." Proceedings of the 1st workshop on Automated control for datacenters and clouds. ACM, 2009.

Rathbone, Casey, et al. "Cyberaide Creative: On-Demand Cyberinfrastructure Provision in Clouds." Pervasive Systems, Algorithms, and Networks (ISPAN), 2009 10th International Symposium on. IEEE, 2009.

Wang, Lizhe, et al. "Provide virtual distributed environments for Grid computing on demand." Advances in Engineering Software 41.2 (2010): 213-219.

* cited by examiner

METHODS AND SYSTEMS FOR GENERATION OF AUTHORIZED VIRTUAL APPLIANCES

CROSS-REFERENCE TO RELATED APPLICATION

This application is a U.S. National Stage Application of and claims priority to International Patent Application No. PCT/US2010/053122, filed on Oct. 19, 2010, and entitled "METHODS AND SYSTEMS FOR GENERATION OF AUTHORIZED VIRTUAL APPLIANCES."

BACKGROUND

Web-based virtual appliance generation systems allow users to define virtual appliances by selecting a software stack and software modules related to a service. Such web-based virtual appliance generation systems encapsulate the software stack and software modules into a virtual appliance. That virtual appliance can then be downloaded and instantiated at a virtual operating platform to make the service available (i.e., to provide the service).

Use of such virtual appliances, however, is complicated or even frustrated altogether by software licenses. For example, some services cannot be freely implemented at virtual appliances because the vendors of the software modules providing those services restrict the use of those software modules by requiring that instances of those software modules be licensed. Known virtual appliance generation systems typically do not generate virtual appliances including configurable licenses to the software modules included within those virtual appliances. Furthermore, such virtual appliance generation systems typically fail to provide adequate security measures to prevent unintended disclosure or unintended alteration of licenses.

As a result, users of such virtual appliance generation systems typically acquire licenses to the software modules of virtual appliances separately from defining and accessing the virtual appliances at the virtual appliance generation system. Such virtual appliance generation systems, therefore, fail to provide virtual appliances (e.g., pre-licensed virtual appliances) that meet the needs and requirements of the users of such virtual appliance generation systems.

DETAILED DESCRIPTION

Figure 1:
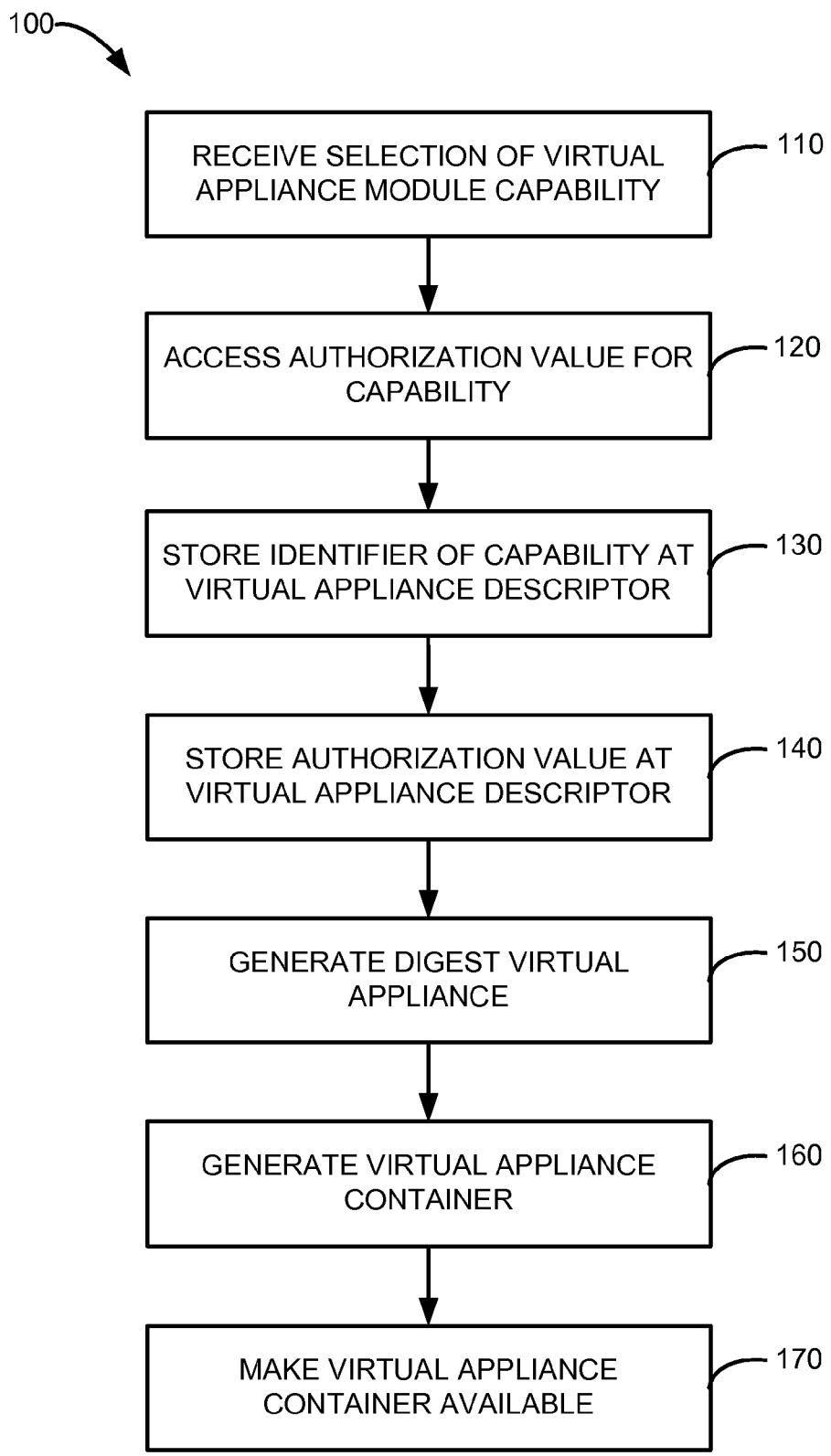
FIG. 1 is a flowchart of a process to generate a virtual appliance, according to an embodiment.

A virtual appliance is a software module (or collection of software modules) that includes the components or elements of a service (or group of services) that is stored at a memory and executed (or hosted) at a processor such as a virtual operating platform to provide the service. Said differently, a virtual appliance includes software modules and a software stack that can be hosted at a processor (e.g., at one or more virtual operating platforms) to effect a service. A service can be a data processing service or a data storage service such as a web server (i.e., a Hypertext Transport Protocol ("HTTP") server), a web application, an electronic mail server, a file transfer protocol ("FTP") server, a database server, a network or cloud data storage service, or some other service. As a specific example, a virtual appliance includes a web server application module and a just enough operating system ("JeOS") (i.e., those parts of an operating system that are used by an application module—here, the web server application module). The web server is accessible when the virtual appliance is instantiated (or hosted) at a virtual operating platform. In other words, the virtual appliance includes all the components of a web server (i.e., a service) that is made available (e.g., accessible by clients such as computing devices hosting web or Internet browsers) when the virtual appliance is executed at a virtual operating platform.

A virtual operating platform is an environment that interprets or executes instructions or code. For example, a virtual operating platform can be a software implementation of a processor or machine that executes code (or instructions) that are executable at that processor or machine. In other words, a virtual operating platform is a software module stored at a memory and executed at a processor (i.e., a virtual operating platform is a software module hosted at that processor) that functions as a processor or computing device. As a specific example, a virtual operating platform can be a software module stored at a memory and executed at a processor that emulates a computer server.

A hypervisor is a hardware module, software module stored at a memory and executed at a processor, and/or a combination of a hardware module and/or a software module that controls, monitors, and/or provisions one or more virtual operating platforms. For example, a hypervisor can instantiate, initialize, pause, shut down, and/or restart virtual operating platforms. Additionally, a hypervisor can communicate with virtual operating platforms. As a specific example, a hypervisor can communicate with virtual operating platforms using a virtualized network interface defined by the hypervisor. Furthermore, a hypervisor can provision or provide access to (e.g., multiplex) components of a computing device (or machine) such as communications interfaces (e.g., a Universal Serial Bus ("USB") interface, an RS232 interface, or a network interface), data stores such as hard disk drives or compact disc ("CD") drives, and/or other components of a computing device to virtual operating platforms. In other words, a hypervisor can be an intermediary between a virtual operating platform and a computing device and/or other virtual operating platforms. As a specific example, a hypervisor can define virtualized components of the physical components of a computing device. The virtual operating platforms associated with that hypervisor can access the virtualized components and the hypervisor can operate as a multiplexer and demultiplexer between the virtualized components and the physical components those virtualized components represent. Thus, a virtual appliance is hosted at a virtual operating platform that is controlled by a hypervisor to provide a service to clients (i.e., computing devices hosting software modules that interact or communicate with that service).

Virtual appliances are useful in delivering services because virtual appliances include the components of those services that are necessary to the operation of those services. That is, a service can be made available by merely instantiating the virtual appliance at a virtual operating platform because the virtual appliance includes the software module (or software modules) that implements a service and the software stack (e.g., middleware, operating system components, and/or drivers) used by that software module. Typically, a virtual appliance is generated (or built or composed) to avoid incompatibilities between the software module (or software modules) implementing the service and the underlying software stack used by the software module. Thus, the user of the virtual appliance can provide the service without configuring the software module to interact with the software stack.

Furthermore, virtual appliances can be generated based on user requirements. For example, web-based virtual appliance generation systems allow users to define virtual appliances by selecting elements of a software stack and software modules related to a service and encapsulate the software stack and software modules into a virtual appliance. That virtual appliance can then be downloaded and instantiated at a virtual operating platform to make the service available (i.e., to provide the service).

Use of virtual appliances, however, is complicated or even frustrated altogether by software licenses. In other words, some services cannot be freely implemented at virtual appliances because the vendors of the software modules implementing those services restrict the use of those software modules by requiring that instances of those software modules be licensed. Known virtual appliance generation systems do not include the ability to generate virtual appliances including licenses to the software modules included within those virtual appliances. A user of such virtual appliances typically acquires licenses to those software modules after receiving the virtual appliance. For example, a user can acquire a license to a software module from the vendor of that software module and install that license at a virtual appliance including that software module after receiving the software module. As another example, a user can acquire a license to operate a certain number of instances of a software module and monitor the number of instances of a virtual appliance including that software module to limit the number of instances of the virtual appliance to the licensed number of instances of the software module. Some services, therefore, cannot be provided using virtual appliances without separately acquiring the virtual appliance and a license because the software modules (i.e., software applications) implementing those services include licensing restrictions (e.g., are configured to operate only when a unique license key is present at a hosting system such as a computing device or virtual operating platform).

Embodiments disclosed herein can generate virtual appliances that include authorization (e.g., licenses) to use the software modules included within those virtual appliances. Thus, a user can request a virtual appliance at a virtual appliance generation system and receive an authorized (e.g., licensed) virtual appliance including the authorizations (or entitlements or licenses) to use the software modules included in the virtual appliance to implement a service.

For example, a virtual appliance generation system can include a virtual appliance selection interface module that defines an interface such as a web interface (e.g., using a web page or group of web pages) to access virtual appliance modules at a virtual appliance module library. A virtual appliance module is a software module or group of software modules that includes the instructions, commands, and/or codes that define (or implement) a virtual appliance. For example, a virtual appliance module can include a virtual disk image such as a Virtual Machine Disk ("VMDK") storing a software stack and a software application that implements a service and an extensible markup language ("XML") document that includes a description of a virtual appliance. In some embodiments, a virtual appliance module can include a group of virtual disk images and an XML document that includes a description of the virtual appliance. For example, one virtual disk image can include an operating system and another virtual disk image can include a software module implementing a service. As a specific example, a virtual appliance module can conform to the Open Virtualization Format ("OVF"). OVF defines packaging, descriptors, and instantiation of virtual appliance modules. The virtual appliance module library includes a group of virtual appliance modules.

A user of the virtual appliance generation system can access the virtual appliance selection interface module via a client such as, for example, a web browser hosted at a client device (i.e., a computing device) to select a virtual appliance module from the virtual appliance module library. For example, the user can click on a representation such as an image or textual description of a virtual appliance module (or a virtual appliance representation) using a mouse of the client device to select that virtual appliance module.

After a virtual appliance module is selected, representations (e.g., icons or images or textual descriptions) of capabilities (or capability representations) of the virtual appliance defined by that virtual appliance module can be displayed to the user via the virtual appliance selection interface module and the client. For example, the virtual appliance module can include a list of capabilities (or functionalities) of the virtual appliance implemented by that virtual appliance module and the virtual appliance selection interface module can display representations of those capabilities to the user (e.g., via the client). The user can select capabilities of the virtual appliance that should be enabled or activated by, for example, clicking on the representation of capabilities to change (or toggle) the status of each capability (i.e., from enabled to disabled or from disabled to enabled). Some capabilities can be enabled or activated by default within the virtual appliance. Such capabilities can be, for example, essential capabilities of a service provided by the virtual appliance. Other capabilities can be disabled by default and can be enabled and used without restriction. For example, such capabilities can be used without a license. Yet other capabilities can be disabled by default and can be enabled and used subject to license restrictions. Furthermore, some capabilities can be enabled by default and can be disabled by the user.

Moreover, some capabilities are characterized or defined by multiple options, attributes, parameters, or values that can be selected and/or specified via the virtual appliance selection interface module. For example, a capability can be a number of concurrent connections a database server implemented within a virtual appliance can maintain. More specifically, for example, a capability identified as (e.g., named) "maximum connection limit" can be the number of concurrent connections a database (i.e., a database server) implemented within a virtual appliance is authorized (or licensed) to maintain or accept. The virtual appliance selection interface module can display (via the client) a list of values from which the user can select or can display a field such as a text box into which the user can enter a value that defines the number of concurrent connections the database server can maintain. As another example, a capability can be communications or network connectivity and a user can specify (i.e., select from a list or enter into a field) via the virtual appliance selection interface module and the client can specify an Internet Protocol ("IP") address such as an IP version 4 ("IPv4") or an IP version 6 ("IPv6") address for that capability. Furthermore, a capability can be a number of concurrent instances of a software application that can be instantiated at any time; a host or computing device name or identifier at which a virtual appliance or software application within a virtual appliance can be instantiated; or a validity period during which a virtual appliance or software application within a virtual appliance can be instantiated or executed.

In addition to capabilities that can be enabled and/or disabled, virtual appliance components (also referred to herein as "components") can be added to a virtual appliance module. Virtual appliance components are software modules that implement capabilities that are not available at other software modules within a virtual appliance. In other words, additional capabilities can be added to a virtual appliance by adding one or more virtual appliance components to a virtual appliance module associated with that virtual appliance. A component can be a software module such as an application module or a library such as a dynamically loaded library that is stored at a virtual disk image. The virtual disk image can be made available (or mounted) as a virtual disk within a virtual operating platform at which the virtual appliance is hosted and the virtual appliance can access the virtual appliance component at the virtual disk. As an example of a virtual appliance component, a virtual appliance can be a web server service that implements HTTP and a component can be a software module that implements the Secure Socket Layer protocol and/or Transport Layer Security protocol. The component can be added to the virtual appliance to provide support for the HTTP Secure ("HTTPS") at the web server service.

Similar to virtual appliance modules and capabilities, representations of virtual appliance components (or virtual appliance component representations) can be displayed to the user via the virtual appliance selection interface module and the client, and the user can select one or more virtual appliance components (e.g., by clicking on a representation such as an image or textual description of a virtual appliance component). Moreover, some virtual appliance components can include multiple capabilities that can be enabled and/or disabled as discussed above in relation to capabilities of a virtual appliance. Furthermore, some virtual appliance components can include capabilities having multiple options, attributes, parameters, or values that can be selected and/or specified via the virtual appliance selection interface module as discussed above in relation to capabilities of a virtual appliance.

Some capabilities and/or components can be restricted by licenses. In other words, some capabilities and/or components cannot be used or enabled within a virtual appliance without a license acquired from a vendor of those capabilities and/or components. After a virtual appliance module, capabilities, and/or components are selected via the virtual appliance selection interface module, selection identifiers of such a virtual appliance module, capabilities, and/or components can be provided to an authorization module of the virtual appliance generation system at which licenses related to those capabilities and/or components can be acquired. For example, the authorization module can determine a cost of one or more licenses for selected capabilities and/or components, and the user can purchase the licenses via an order processing module of the virtual appliance generation system. As a specific example, the order processing module can include a web-based interface (or can be coupled with virtual appliance selection interface module to provide a web-based interface) the user can access via the client to purchase the licenses using a credit card or account number. The order processing module can charge an account associated with the credit card or account number and provide payment confirmation to the authorization module indicating that the licenses have been purchased. In some embodiments, an order processing module can be integrated within (or a part or element of) a virtual appliance generation system. In other embodiments, an order processing module can be external to a virtual appliance generation system and the virtual appliance generation system can communicate with the order processing module to determine when an order related to a virtual appliance is processed.

The authorization module can then generate an authorization value (e.g., a license key) for each selected capability and component for which a license was purchased. In some embodiments, the authorization values can be encrypted such that a license enforcement module included in a virtual appliance can decrypt the authorization values and provide the decrypted authorization values to the capabilities (or software modules implementing the capabilities) and/or components when the virtual appliance is instantiated at a virtual operating platform to enable those capabilities and/or components.

The virtual disk images including the software stack, software application, and components of the virtual appliance and a virtual appliance descriptor such as, for example, an XML document including identifiers, options, attributes, parameters, values, and/or authorization values of the virtual appliance, capabilities, and/or components can be aggregated into a virtual appliance container that includes all the elements (e.g., virtual disk images, authorization values, identifiers of the virtual appliance, capabilities and components, and options, attributes, parameters and/or values associated with the virtual appliance, capabilities and components) of a virtual appliance. A virtual appliance container (or container) can be, for example, an archive file such as a TAR file. In some embodiments, the virtual appliance container can be compressed to reduce the size (e.g., number of bytes) of the virtual appliance container.

The virtual appliance container can then be provided to the user. For example, the virtual appliance container can be made available for download via a download web page and an electronic mail message (or another notification) including a reference (e.g., Uniform Resource Identifier ("URI") such as a hyperlink or link) to the virtual appliance container can be sent to an electronic mailbox of the user. The user can download the virtual appliance container and provide the container to a virtual operating platform configured to interpret the virtual appliance descriptor to instantiate a virtual appliance at a virtual appliance using the elements (e.g., virtual disk images and virtual appliance descriptor) of the virtual appliance container. Because the authorization values and identifiers, options, attributes, parameters, and/or values of capabilities and components are included in the virtual appliance descriptor, the user need not separately acquire, for example, licenses for the capabilities and/or components. Thus, the user can interact with the virtual appliance generation system to generate a virtual appliance container that can be instantiated as a virtual appliance at a virtual operating platform without separate license acquisition.

As used herein, the singular forms "a," "an," and "the" include plural referents unless the context clearly dictates otherwise. Thus, for example, the term "virtual appliance" is intended to mean one or more virtual appliances or a combination of virtual appliances. Additionally, as used herein, the term "module" refers to circuitry and/or software, firmware, programming, machine- or processor-readable instructions, commands, or code that are stored at a memory and executed or interpreted at a processor.

FIG. 1 is a flowchart of a process to generate a virtual appliance, according to an embodiment. Process 100 can be implemented as a hardware module, as a software module, and/or as a combination of a hardware module and a software module. For example, process 100 can be implemented as application-specific circuitry or as a software module including instructions stored at a memory and executed at a processor in communication with the memory. More specifically, for example, process 100 can be implemented at a virtual appliance generation system.

A selection of a virtual appliance capability is received at block 110. For example, a selection identifier such as a name or numeric identifier of a capability of a virtual appliance or virtual appliance component selected via a web-based interface of a virtual appliance generation system can be provided to an authorization module of the virtual appliance generation system. The selection identifier can then be used to access an authorization value for the capability at block 120.

An authorization value is a value such as an alphanumeric character sequence that is interpreted by an application module and/or a component of a virtual appliance to enable a capability of the virtual appliance, the component, and/or a capability of the component. In some embodiments, the authorization value can be a digital certificate. Moreover, an authorization value can be a license key (or license key value) that enables a capability or component within a virtual appliance.

The authorization value can be accessed from one or more sources. For example, the virtual appliance generation system can request the authorization value from a vendor of an application module or a component of the virtual appliance. Said differently, the virtual appliance generation system can communicate with a third-party system (e.g., a computer server) to access the authorization value. Alternatively, for example, the virtual appliance generation module can generate the authorization value. In other words, the authorization value can be accessed at the virtual appliance generation system after the authorization value is generated at the virtual appliance generation value.

After the authorization value is accessed, an identifier of the capability for which the selection identifier was received at block 110 is stored at a virtual appliance descriptor at block 130 and the authorization value is stored at the virtual appliance descriptor at block 140. A virtual appliance descriptor is a collection of values, identifiers, and/or textual strings that describe a virtual appliance and the elements of the virtual appliance. For example, a virtual appliance descriptor can be an XML document including identifiers, options, attributes, parameters, values, and/or authorization values of the virtual appliance and/or of the capabilities and/or components of the virtual appliance. As a specific example, a virtual appliance descriptor can be an OVF descriptor.

A digest of the virtual appliance based on the virtual appliance descriptor and virtual disk images of the virtual appliance is generated at block 150. A digest is a value that is calculated from a group of other values. For example, a hash value generated by applying a hash function to a virtual appliance descriptor and virtual disk images can be a virtual appliance descriptor. In some embodiments, the digest is generated using a cryptographic hash function or other hash function that demonstrates a strong avalanche property, a strong collision resistance, and preimage resistance (i.e., the hash function is resistant to first and second preimage attacks). As a specific example, a digest can be generated by applying the SHA1 hash algorithm to the virtual appliance descriptor and virtual disk images of a virtual appliance. Such hash functions are desirable because given a digest generated by such a hash function for a particular input (e.g., virtual appliance descriptor and virtual disk images), it is difficult to generate or identify a different input for which such that hash function generates that digest. Thus, another digest can be later generated by applying the virtual appliance descriptor and virtual disk images to the hash function used to generate the digest at block 150. If that digest has a value that is the same as the value of the digest generated at block 150, it is unlikely that the virtual appliance descriptor or virtual disk images have changed or been altered (i.e., the virtual appliance descriptor and the virtual disk images are the same when the digest was generated at block 150 when the and later-generated digest was generated). Said differently, a later generated digest that matches the digest generated at block 150 (i.e., both digests have a common value) indicates that the virtual appliance descriptor and virtual disk images have not been altered.

A virtual appliance container is generated at block 160 by combining all the elements of the virtual appliance such as the virtual appliance descriptor and any virtual disk images of the virtual appliance into a virtual appliance container. In other words, all the elements of the virtual appliance are aggregated into a virtual appliance container at block 160. A virtual appliance container (or container) can be, for example, an archive file such as a TAR file. Alternatively, for example, a virtual appliance container can be a virtual disk image (i.e., a file that represents a processor-readable medium such as an optical disk, a magnetic disk, or a FLASH disk) including the elements of the virtual appliance. In some embodiments, the virtual appliance container can be compressed to reduce the size of (i.e., the number of bytes occupied by) the virtual appliance container.

The virtual appliance container is then made available (or provided) to a client of the virtual appliance generation system at block 170. For example, a reference or hyperlink to the virtual appliance container can be posted at a web page available to the client. Thus, a user of the client can access or download the virtual appliance module. Alternatively, for example, the virtual appliance container can be made available (or provided) to the client by sending the virtual appliance container to the client. The virtual appliance container can be made available via one or more protocols including, for example, HTTP, HTTPS, and FTP. In some embodiments, a username and password, a passkey, a digital certificate, and/or some other credential can be received from the client and verified before the virtual appliance container is sent to the client in response to a request from the client for the virtual appliance container. Moreover, the virtual appliance generation system can send a notification such as an electronic mail message or an instant message ("IM") to a user of the virtual appliance generation system that includes a reference or hyperlink to the virtual appliance container.

Process 100 can include blocks in addition to those illustrated in FIG. 1. Additionally, one or more blocks can be rearranged. Furthermore, although process 100 is discussed above with reference to an example environment including a virtual appliance generation system, process 100 is applicable within other environments.

Figure 2:
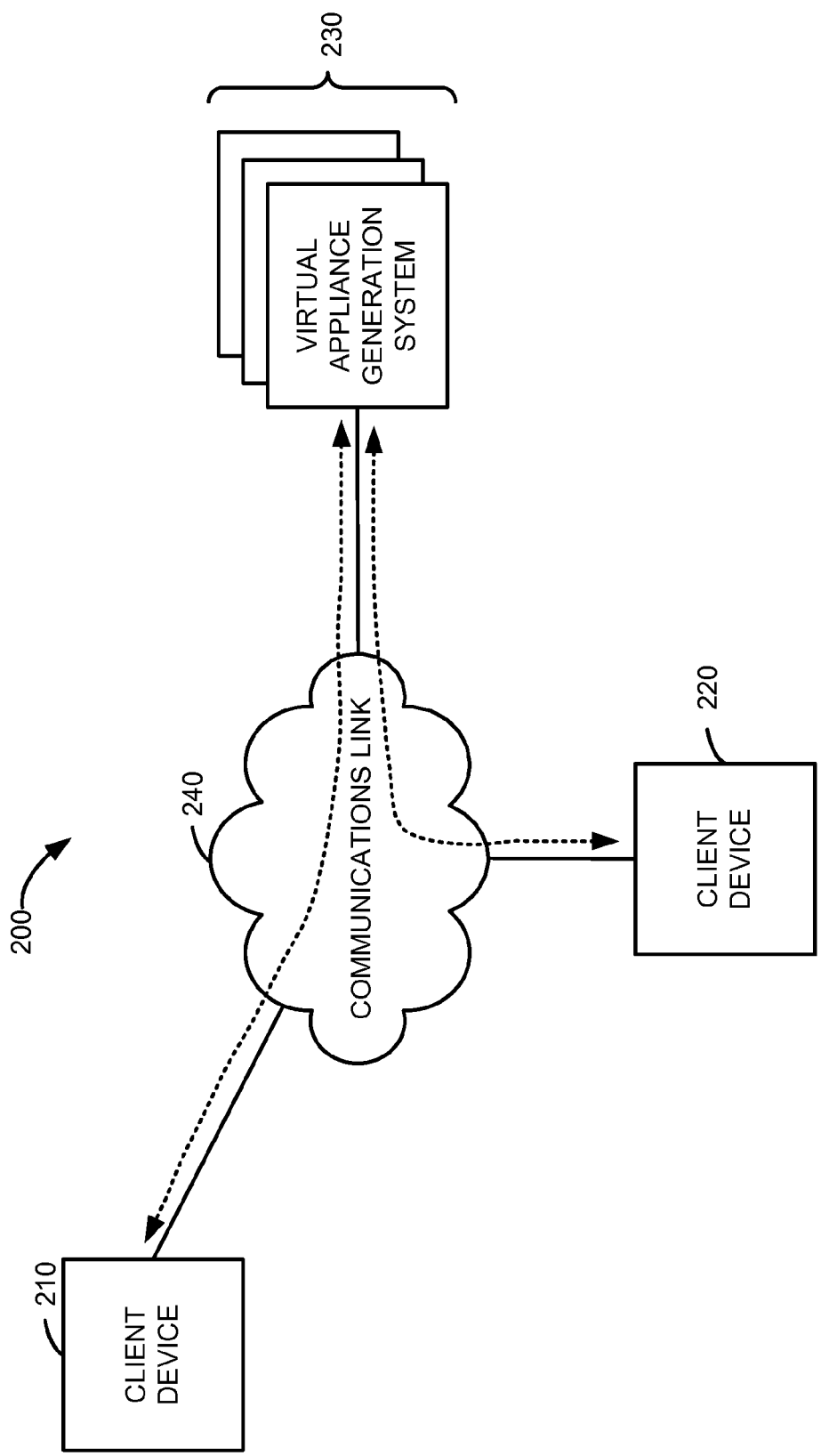
FIG. 2 is an illustration of an environment including a virtual appliance generation system, according to an embodiment.

FIG. 2 is an illustration of an environment including a virtual appliance generation system, according to an embodiment. Environment 200 includes client device 210, client device 220, virtual appliance system 230, and communications link 240. Environment 200 is illustrated logically. In other words, the placement of and connections among the elements of environment 200 (e.g., client device 210, client device 220, and virtual appliance generation system 230) represent logical relationships between the elements rather than their physical configuration. Said differently, the placement of and connections among the elements of environment 200 illustrate communication of data symbols or data signals transmitted within environment.

Figure 3:
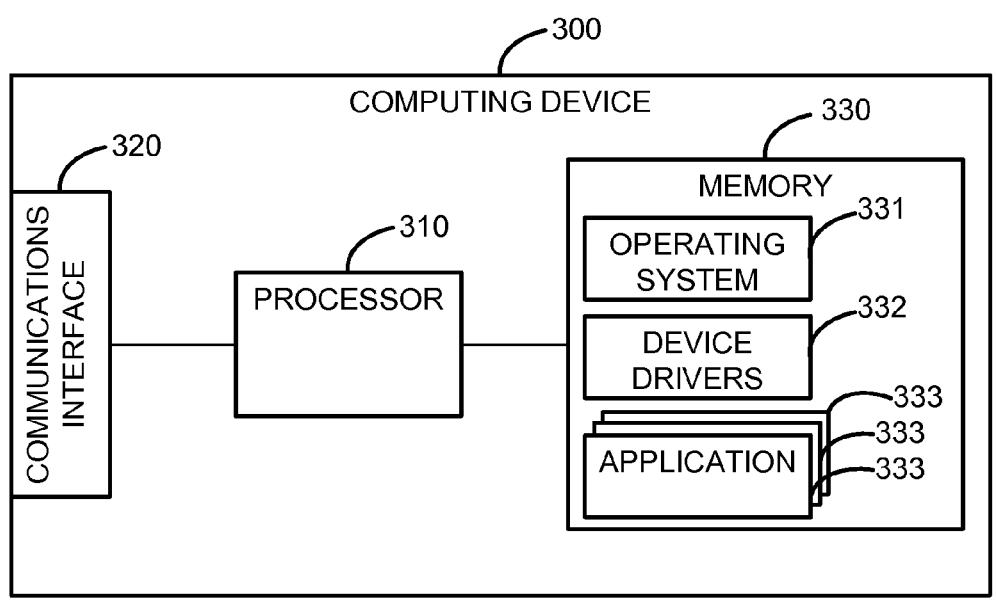
FIG. 3 is a schematic block diagram of a computing device, according to an embodiment.

Client devices 210 and 220 are computing devices such as personal computers, laptop or notebook computers, smartphones, thin clients, tablets, or other computing devices that can access virtual appliance generation system via communications link 240. As an example of a computing device, FIG. 3 is a schematic block diagram of a computing device, according to an embodiment. As illustrated in FIG. 3, computing device 300 includes communications interface 320, processor 310, and memory 330. Processor 310 is operatively coupled to communications interface 320 and memory 330. Typically, as illustrated in FIG. 3, memory 330 includes instructions or codes (e.g., computer codes or object codes) defining software modules that are executed by processor 310 during operation of computing device 310. For example, memory 330 includes instructions that define operating system 331, device drivers 332, and applications 333 (e.g., software application programs). In other words, operating system 331, device drivers 332, applications 333, and other software modules stored as instructions (not shown) at memory 330 and executed at processor 310 are hosted at computing device 300. Applications 333 can include, for example, an application module, a hypervisor, a virtual appliance module, and/or an environment such as a runtime environment and/or virtual operating platform instance.

Memory 330 can include volatile memory such as static random access memory ("SRAM") and/or dynamic random access memory ("DRAM") and nonvolatile memory such as magnetic media (e.g., a hard disk drive), optical media (e.g., a compact disc ("CD") and/or a digital video disc ("DVD")), solid-state media (e.g., a USB FLASH memory device), and/or other processor-readable media. For example, nonvolatile memory can be used as long-term storage for operating system 331, device drivers 332, applications 333, data files (not shown), and/or other software modules stored as instructions (not shown), and operating system 331, device drivers 332, applications 333, data files (not shown), and/or other software modules stored as instructions (not shown) can be loaded into volatile memory for execution at processor 310.

Communications interface 320 is an interface accessible to processor 310 to communicate with (i.e., transmit symbols representing data to and receive such symbols from) other processors and/or computing devices via a communications link. In other words, communications interface 320 can receive data from processor 310 and transmit symbols representing that data via a communications link. Moreover, communications interface 320 can receive symbols from other communications interfaces via a communications link and send data represented by those symbols to processor 310. For example, communications interface 320 can be a telephone network interface, a twisted-pair network interface, a coaxial network interface, a fiber-optic network interface, a wireless network interface such as a wireless local area network ("WLAN") or a cellular network, and/or some other network or communications interface.

Referring to FIG. 2, communications link 240 can include any connector and/or system that allow client devices 210 and 220 to communicate with virtual appliance generation system 230. For example, communications link 240 can be one or more of a cable (e.g., telecommunication cable, twisted-pair cable, coaxial cable, or fiber-optic cable), wireless link or connection (e.g., radio-frequency link, wireless optical link, infrared link, or sonic link), or any other connector or system that supports transmission of communications symbols. Additionally, communications link 240 can include a communications network or combination of communications networks capable of transmitting information (e.g., symbols or signals representing data) such as, for example, an Ethernet network, a fiber-optic network, a wireless network, an intranet, and/or the Internet.

In some embodiments, communications link 240 can include multiple communications links and/or communications networks operatively coupled one to another by, for example, bridges, routers, switches, hubs, and/or gateways. For example, client device 210 can be operatively coupled to a cellular network (not shown) and virtual appliance generation system 230 can be operatively coupled to a fiber-optic network (not shown). The cellular network and fiber-optic network can each be operatively coupled one to another via one or more network bridges, routers, switches, and/or gateways such that the cellular network and the fiber-optic network are operatively coupled to form a communications link. Alternatively, the cellular network and fiber-optic network can each be operatively coupled one to another via one or more additional communications networks. For example, the cellular network and the fiber-optic network can each be operatively coupled to the Internet such that the cellular network, the fiber-optic network and the Internet are operatively coupled to form a communications link.

As illustrated in FIG. 2, client devices 210 and 220 can communicate with virtual appliance generation system 230 via communications interface 240. For example, virtual appliance generation system 230 can include a virtual appliance selection interface module that defines a web-based interface such as a group of web pages that are produced dynamically in response to input or requests from a web browser hosted at client device 210 via which a user of client device 210 can access virtual appliance generation system 230 and select or specify virtual appliance modules, capabilities, virtual appliance components, and/or options, attributes, parameters, or values of a virtual appliance generated at virtual appliance generation system 210. In other words, users can access virtual appliance generation system 230 via client device 210 and/or client device 220.

Virtual appliance generation system 230 includes one or more computing devices such as computing servers and/or virtual operating platforms that implement a service configured to generate authorized (or licensed) virtual appliances. Said differently, virtual appliance generation system 230 can include multiple computing devices or virtual operating platforms that implement a virtual appliance generation service. For example, the computing devices and/or virtual operating platforms that define virtual appliance generation system 230 can be included within one or more data centers. In some embodiments, the computing devices and/or virtual operating platforms that define virtual appliance generation system 230 can be included within data centers that are geographically distributed. Furthermore, the computing devices and/or virtual operating platforms that define virtual appliance generation system 230 can be independent one or another or can be federated and/or otherwise operatively coupled to operate cooperatively.

As a specific example, a first group of computing devices and/or virtual operating platforms implements a front end to virtual appliance generation system 230 such as a web-based interface. A second group of computing devices and/or virtual operating platforms implements an authorization or licensing service that generates and/or accesses authorization values for capabilities and/or components of a virtual operating platform selected by a user. A third group of computing devices and/or virtual operating platforms implements an FTP service via which users access virtual appliance containers including virtual operating platforms configured (or built) in response to input from those users to the front end of the virtual appliance generation system. Each group of computing devices and/or virtual operating platforms communicates with one or more other groups of computing devices and/or virtual operating platforms to generate virtual appliance containers. For example, the first group of computing devices and/or virtual operating platforms provides selection identifiers of the capabilities and/or virtual appliance components selected by the user via the front end to the second group of computing devices and/or virtual operating platforms, and the second group of computing devices and/or virtual operating platforms accesses or generates authorization values based on those selection identifiers. The third group of computing devices and/or virtual operating platforms provides a virtual appliance container including the elements of a virtual appliance defined by the user's selections via the front end in response to a request for the virtual appliance container from a client device.

Figure 4:
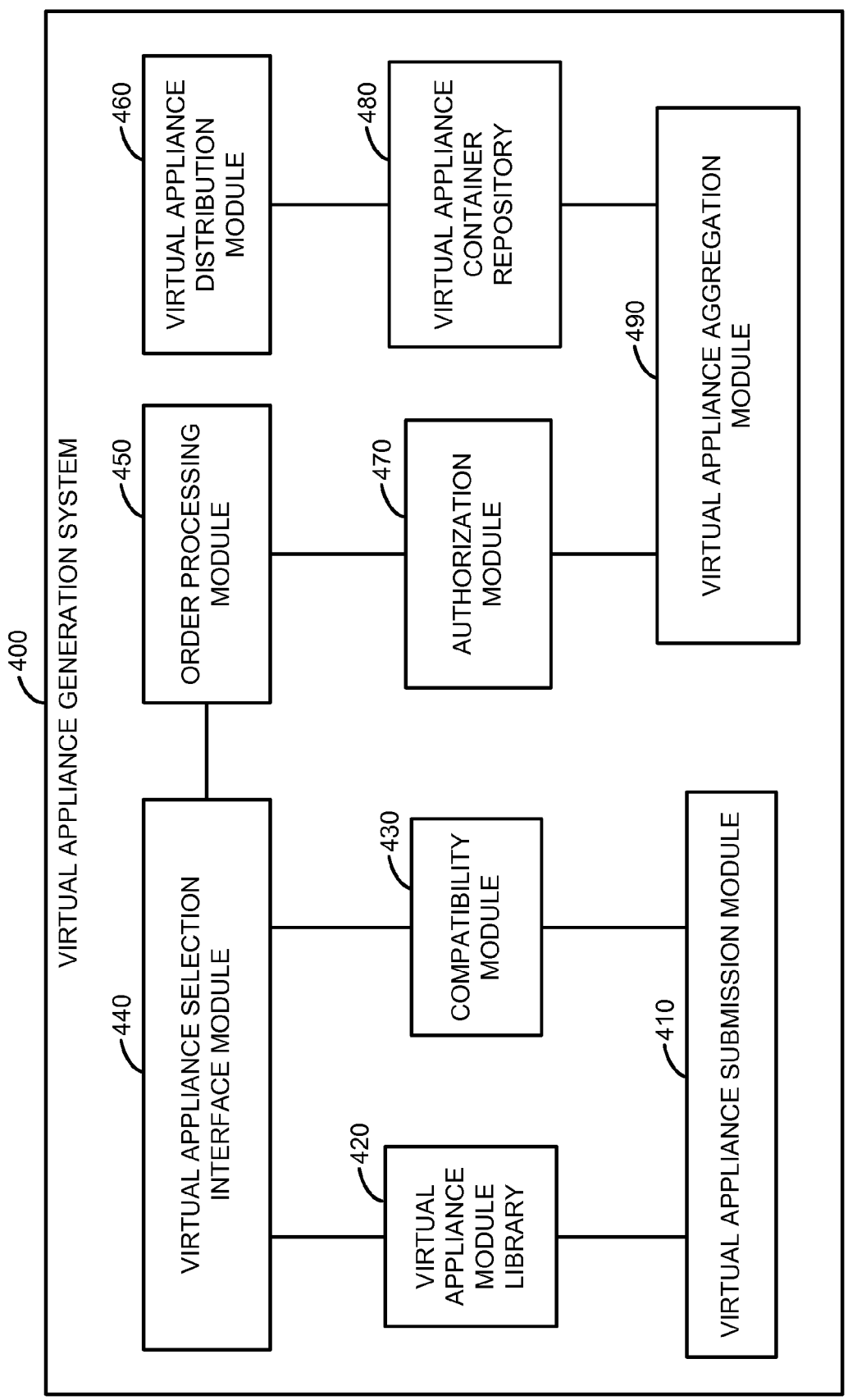
FIG. 4 is a schematic block diagram of a virtual appliance generation system, according to an embodiment.

FIG. 4 is a schematic block diagram of a virtual appliance generation system, according to an embodiment. Virtual appliance generation system 400 includes virtual appliance submission module 410, virtual appliance module library 420, compatibility module 430, virtual appliance selection interface module 440, order processing module 450, authorization module 470, virtual appliance aggregation module 490, virtual appliance container repository 480, and virtual appliance distribution module 460. Each of virtual appliance submission module 410, virtual appliance module library 420, compatibility module 430, virtual appliance selection interface module 440, order processing module 450, authorization module 470, virtual appliance aggregation module 490, virtual appliance container repository 480, and virtual appliance distribution module 460 can include a hardware module, a software module stored at a memory and executed at a processor (or hosted at a processor), and/or a combination of a hardware module and a software module. As discussed above, virtual appliance submission module 410, virtual appliance module library 420, compatibility module 430, virtual appliance selection interface module 440, order processing module 450, authorization module 470, virtual appliance aggregation module 490, virtual appliance container repository 480, and virtual appliance distribution module 460 can be implemented an different computing devices and/or virtual operating platforms. Said differently, virtual appliance generation system 400 is illustrated logically. In other words, the placement of and connections among the modules of virtual appliance generation system 400 represent logical relationships between the module rather than their physical configuration.

Virtual appliance submission module 410 defines an interface such as a web-based interface via which a user of virtual appliance generation system 400 can upload or submit a virtual appliance module to virtual appliance generation system 400. That is, virtual appliance submission module 410 is the back end interface to virtual appliance generation system 400 via which virtual appliance modules are input or added to virtual appliance module library 420. For example, a user can use a virtual appliance tool such as VMware Studio™ to define a virtual appliance module (e.g., a virtual appliance module including one or more virtual disk images packaged in conformance with OVF). The user can then access virtual appliance submission module 410 via a web browser (or other client) and upload the virtual appliance module to virtual appliance generation module 400 using the web browser. Virtual appliance submission module 410 receives the virtual appliance module and stores the virtual appliance module at virtual appliance module library 420. Virtual appliance module library 420 is a data store or data storage service such as a hard disk drive, network accessible storage device such as a network attached storage ("NAS") device or a storage area network ("SAN") device, a database, or some other data store or data storage service.

Virtual appliance components can also be uploaded to virtual appliance generation system 400 via virtual appliance submission module 410. For example, a software application can be stored or packaged at a virtual disk image and the virtual disk image uploaded to virtual appliance generation system 400 via virtual appliance submission module 410 using, for example, a web browser.

Metadata such as descriptions and/or images related to virtual appliance modules, virtual appliance components, and/or capabilities can also be uploaded to virtual appliance generation system 400 via virtual appliance submission module 410. For example, a web page defined by virtual appliance submission module 410 for uploading a virtual appliance module or virtual appliance component to virtual appliance generation system 400 can include a text field that accepts a description of the virtual appliance module or virtual appliance component. Alternatively, for example, a description of the virtual appliance module or virtual appliance component can be included in a file such as a text file or an XML document that is uploaded to virtual appliance generation system 400 via virtual appliance submission module 410. The description can be stored at virtual appliance module library 420 with the virtual appliance module or virtual appliance component and can be displayed to a user of virtual appliance generation system 400 via virtual appliance selection interface module 440 when that user accesses virtual appliance generation system 400 via virtual appliance selection interface module 440 to select a virtual appliance module, virtual appliance component, and/or capabilities of a virtual appliance.

Additionally, compatibility information related to virtual appliance modules, capabilities of virtual appliances, virtual appliance components, and/or capabilities of virtual appliance components, can be uploaded to virtual appliance generation system 400 via virtual appliance submission module 410. Such information can be stored within virtual appliance generation system 400 at compatibility module 430. Compatibility module 430 includes a data store such as a hard disk drive, network accessible storage device, a database, or some other data store to store the compatibility information.

Compatibility information can include a list of capabilities available at one or more software modules of a virtual appliance module, a list of capabilities available at one or more virtual appliance components, a list of virtual appliance modules that can be hosted at a common virtual operating platform (or a common group of virtual operating platforms) with another virtual appliance module, a list virtual appliance components that are compatible with (i.e., can interact or coexist within a virtual operating platform with) a virtual appliance module, a list of virtual appliance modules that cannot be hosted at a common virtual operating platform (or a common group of virtual operating platforms) with another virtual appliance module, a list virtual appliance components that are not compatible with (i.e., cannot interact or coexist within a virtual operating platform with) a virtual appliance module. Moreover, compatibility information can include descriptions, images, and/or other information such as a version number or a vendor identifier or name of a virtual appliance module, a virtual appliance component, or a capability. Furthermore, compatibility information can include options, attributes, parameters, and/or ranges of values of capabilities that can be displayed to, selected by, and/or specified by a user of virtual appliance generation system 400 via virtual appliance selection interface module 440.

Compatibility information can be specified for a virtual appliance module, virtual appliance component, or capability when a virtual appliance module or virtual appliance component is uploaded to virtual appliance generation system 400. For example, a web page defined by virtual appliance submission module 410 for uploading a virtual appliance module or virtual appliance component to virtual appliance generation system 400 can include a text field that accepts a compatibility information related to a virtual appliance module, virtual appliance component, and/or capabilities of a virtual appliance module or virtual appliance component. Alternatively, for example, compatibility information related to a virtual appliance module, virtual appliance component, and/or capabilities of a virtual appliance module or virtual appliance component can be included in a file such as a flat text file or a hierarchical (or structured) file such as an XML document that is uploaded to virtual appliance generation system 400 via virtual appliance submission module 410 and stored at compatibility module 430.

Virtual appliance selection interface module 440 defines an interface via which users of virtual appliance generation system 400 can select virtual appliance modules, virtual appliance components, and/or capabilities for a virtual appliance. Furthermore, a user can select and/or specify options, attributes, parameters, and/or values of capabilities via virtual appliance selection interface module 440. As a specific example, virtual appliance selection interface module can be a web-based interface that is accessible by users of virtual appliance generation system 400 at a web browser via HTTP or HTTPS. Virtual appliance selection interface module 440 communicates with virtual appliance module library 420 to access virtual appliance modules and displays representations of those virtual appliance modules to users via virtual appliance selection interface module 440.

Virtual appliance selection interface module 440 also receives selection identifiers of virtual appliance module selected by the user and displays to the user representations of virtual appliance components and/or capabilities compatible with a selected virtual appliance module based on compatibility information stored at compatibility module 430. For example, virtual appliance selection interface module 440 can receive a selection identifier of a virtual appliance module and provide that selection identifier to compatibility module 430. Compatibility module 430 can access the compatibility information stored at (or accessible to) compatibility module 430 that is associated with the virtual appliance module identified by the selection identifier and send to virtual appliance selection interface module 440 compatibility information such as a list of capabilities and/or virtual appliance components that are compatible with that virtual appliance module. Similarly, virtual appliance selection interface module 440 can provide a selection identifier of a virtual appliance component selected by the user to compatibility module 430 and compatibility module 430 can provide compatibility information such as a list of capabilities of that virtual appliance component, other virtual appliance components that are compatible with that virtual appliance component, and/or other virtual appliance modules that are compatible with that virtual appliance component. Furthermore, virtual appliance selection interface module 440 can provide a selection identifier of a capability or an option, attribute parameter, or value of a capability to compatibility module 430 and compatibility module 430 can provide a list of compatible capabilities, compatible virtual appliance components, and/or compatible virtual appliance modules.

After virtual appliance modules, virtual appliance components, capabilities, and options, attributes, parameters, and/or values of capabilities are selected or specified via virtual appliance selection interface module 440, virtual appliance selection interface module 440 can provide selection identifiers of the virtual appliance modules, virtual appliance components, and/or capabilities and options, attributes, parameters, and/or values of capabilities to order processing module 450. Order processing module 450 determines which, if any, of the virtual appliance modules, virtual appliance components, capabilities, and options, attributes, parameters, and/or values of capabilities should be authorized or licensed. For example, order processing module 450 can access a list of virtual appliance modules, virtual appliance components, and/or capabilities that should be authorized before a virtual appliance container including the virtual appliance modules, virtual appliance components, and/or capabilities is generated. Additionally, order processing module 450 can access a list of virtual appliance modules, virtual appliance components, and/or capabilities that need not be authorized before a virtual appliance container including the virtual appliance modules, virtual appliance components, and/or capabilities is generated. In some embodiments, compatibility information stored at compatibility module 430 can include such information.

Order processing module 450 also defines an interface such as a web-based interface to receive payment for the virtual appliance modules, virtual appliance components, and/or capabilities that should be authorized. Alternatively, order processing module 450 can communicate with virtual appliance selection interface module 440 or a payment processing service to receive payment for the virtual appliance modules, virtual appliance components, and/or capabilities that should be authorized. For example, order processing module 450 can communicate with virtual appliance selection interface module 440 to provide a secure payment web page to a user via which the user can provide a credit card number or account number that can be charged for the authorization for the virtual appliance modules, virtual appliance components, and/or capabilities. The order processing module can receive the credit card number or account number from the virtual appliance selection interface module and provide that credit card number or account number to a payment processing service such as a service provided bank or other financial institution to bill the account associated with the credit card number or account number for the authorization. Furthermore, order processing module 450 can receive confirmation (e.g., from the payment processing service) that the account was successfully charged.

Order processing module 450 can then provide an entitlement confirmation (e.g., a payment confirmation) or multiple entitlement confirmations (i.e., one for each of the virtual appliance modules, virtual appliance components, and/or capabilities and options, attributes, parameters, and/or values of capabilities for which payment was processed), the selection identifiers of the virtual appliance modules, virtual appliance components, and/or capabilities and options, attributes, parameters, and/or values of capabilities to authorization module 470. Alternatively, for example, authorization module 470 can receive the selection identifiers of the virtual appliance modules, virtual appliance components, and/or capabilities and options, attributes, parameters, and/or values of capabilities from virtual appliance selection interface module 440 and can receive entitlement confirmations related to virtual appliance modules, virtual appliance components, and/or capabilities and options, attributes, parameters, and/or values of capabilities for which payment was processed from order processing module 450. Authorization module 470 generates or accesses authorization values such as license key values for the virtual appliance modules, virtual appliance components, and/or capabilities that should be licensed. In other words, authorization module 470 generates or accesses authorization values for the virtual appliance modules, virtual appliance components, and/or capabilities for which an entitlement confirmation was received.

Authorization module 470 can generate authorization values based on processes or algorithms specified by vendors of the selected virtual appliance modules, virtual appliance components, and/or capabilities for generating value authorization values for those the virtual appliance modules, virtual appliance components, and/or capabilities. Alternatively, authorization module 470 can access authorization values at one or more data stores such as databases that include value authorization values for those the virtual appliance modules, virtual appliance components, and/or capabilities. Moreover, authorization module 470 can be in communication with licensing services of the vendors of the virtual appliance modules, virtual appliance components, and/or capabilities and can access (e.g., request and receive) authorization values at those licensing services.

Virtual appliance aggregation module 490 receives the authorization value and the selection identifiers of the selected virtual appliance modules, virtual appliance components, and/or capabilities and options, attributes, parameters, and/or values of capabilities from authorization module 470 and generates a virtual appliance descriptor including the authorization value and identifiers of the selected virtual appliance modules, virtual appliance components, and/or capabilities and options, attributes, parameters, and/or values of capabilities. As discussed above, a virtual appliance descriptor describes a virtual appliance. That is, a virtual appliance descriptor includes identifiers, descriptors, options, attributes, parameters, values, and/or other information related the virtual appliance modules, virtual appliance components, and/or capabilities of a virtual appliance. For example, a virtual appliance can be a file including such information. As a more specific example, a virtual appliance descriptor can be an XML document including identifiers, options, attributes, parameters, values, and/or authorization values of the virtual appliance modules, capabilities, and/or components of a virtual appliance. As a specific example, a virtual appliance descriptor can be an OVF descriptor.

Virtual appliance aggregation module 490 also accesses the virtual appliance modules and components of the virtual appliance using the selection identifiers received, for example, for authorization module 470. For example, virtual appliance aggregation module 490 can access a virtual appliance descriptor and a virtual disk image for each selection identifier of a virtual appliance module received from authorization module 470. Additionally, virtual appliance aggregation module 490 can access a virtual disk image for each selection identifier of a virtual appliance component received from authorization module 470.

The virtual appliance descriptors (or portions thereof) associated with the virtual appliance modules can be included in the virtual appliance descriptor generated at virtual appliance aggregation module 490. In other words, portions of the virtual appliance descriptors accessed at virtual appliance module library 420 can be aggregated or coalesced into the virtual appliance descriptor generated at virtual appliance aggregation module 490. It should be understood that when an entire first virtual appliance descriptor is aggregated into a second virtual appliance descriptor, a portion of the first virtual appliance descriptor is aggregated into the second virtual appliance descriptor.

Virtual appliance aggregation module 490 then generates digests of some or all of the elements of the virtual appliance. That is, virtual appliance aggregation module 490 can generate a digest of the virtual appliance descriptor and the virtual disk images of the virtual appliance modules and virtual appliance components. These digests can be, as discussed above, compared at a later time with digests generated at the later time to determine whether the elements of the virtual appliance have been changed, altered, and/or corrupted after the digests were generated at virtual appliance aggregation module 490. In some embodiments, virtual appliance aggregation module 490 signs (or applies a digital signature to) the digests with a digital certificate of virtual appliance generation system 400. For example, virtual appliance aggregation module 490 can store the digests in a manifest file (i.e., a file including the digests) and can generate a digest of the manifest file and encrypt the digest of the manifest file with a private encryption key of a public/private encryption key pair associated with virtual appliance generation system 400 to sign the digests. Alternatively, for example, virtual appliance aggregation module 490 can store the digests in a manifest file (i.e., a file including the digests) and can encrypt the manifest file with a private encryption key of a public/private encryption key pair associated with virtual appliance generation system 400 to sign the digests.

Such digital signatures allow a client of virtual appliance generation system 400 to later access a digital certificate such as an X.509 certificate of the virtual appliance generation system 400 that includes the public encryption key of the public/private encryption key pair associated with virtual appliance generation system 400 and verify that the digests were generated at virtual appliance generation system 400. More specifically, the client can verify the contents of the digital certificate using a signature of a certificate authority within the digital certificate and then decrypt the manifest file (or the digest of the manifest file) using the public encryption key included within the digital certificate. Because the digital certificate (which has been verified) attests to the identity of the owner of the public encryption key (i.e., the public encrypt key belongs to (or is associated with) a public/private encryption key pair of virtual appliance generation system 400), and the public encryption key decrypts the manifest file (or the digest of the manifest file which can be verified by generating a digest of the manifest file and comparing that digest with the decrypted digest), the client can trust or have confidence that the digests were generated at virtual appliance generation system 400.

After the digests are generated, virtual appliance aggregation module 490 then aggregates the virtual appliance descriptor generated at virtual appliance aggregation module 490, the digests (e.g., a manifest file) and a related signature, the virtual disk images associated with virtual appliance modules, and the virtual disk images associated with virtual appliance components into a virtual appliance container. In some embodiments, the digests and related signature can be included in the virtual appliance descriptor generated at virtual appliance aggregation module 490. A virtual appliance container is a collection or group of elements (e.g., virtual appliance descriptor and virtual disk images). As a specific example, the virtual appliance descriptor at virtual appliance aggregation module 490 and the virtual disk images associated with the virtual appliance modules and virtual appliance components can be included in an archive file such as a TAR file. In other words, one or more portions of a virtual appliance module can be aggregated into a virtual appliance container. It should be understood that when an entire virtual appliance module is aggregated into a virtual appliance container, a portion of the virtual appliance module is aggregated into the virtual appliance container. In some embodiments, the virtual appliance container can be compressed to reduce the size (e.g., number of bytes) of the virtual appliance container.

The virtual appliance container is then provided to virtual appliance container repository 480 and is available to clients via virtual appliance distribution module 460. Virtual appliance repository 480 is a data store or data storage service such as a hard disk drive, network accessible storage device such as a NAS device or a storage area network SAN device, a database, or some other data store or data storage service at which virtual appliance containers are stored. Virtual appliance distribution module 460 defines an interface via which virtual appliance containers stored at virtual appliance container repository 480 are accessible to clients of virtual appliance generation system 400. For example, virtual appliance distribution module 460 can provide an FTP service. Alternatively, for example, virtual appliance distribution module 460 can be a web server and can define web pages that include hyperlinks to the virtual appliance containers within virtual appliance container repository 480 via which the virtual appliance containers can be accessed and/or or downloaded by clients of virtual appliance generation system 400.

Virtual appliance generation system 400 can include additional and/or other modules than those illustrated in FIG. 4. For example, virtual appliance generation system 400 can include one or more authentication modules to authenticate clients of virtual appliance generation system 400 before, for example, allowing client to access virtual appliance containers via virtual appliance distribution module 460. As another example, virtual appliance generation system 400 can include a notification module to send notifications including references to virtual appliance containers (e.g., hyperlinks to virtual appliance containers or to a web pages defined by virtual appliance distribution module 460 that include hyperlinks to virtual appliance containers) to clients of virtual appliance generation system 400 after virtual appliance aggregation module 490 provides a virtual appliance container to virtual appliance container repository 480. Furthermore, virtual appliance generation system 400 can include fewer modules than those illustrated in FIG. 4. For example, the functionalities of one or more modules can be included in other modules. In other words, two or more modules illustrated in FIG. 4 can be aggregated into fewer modules.

Figure 5:
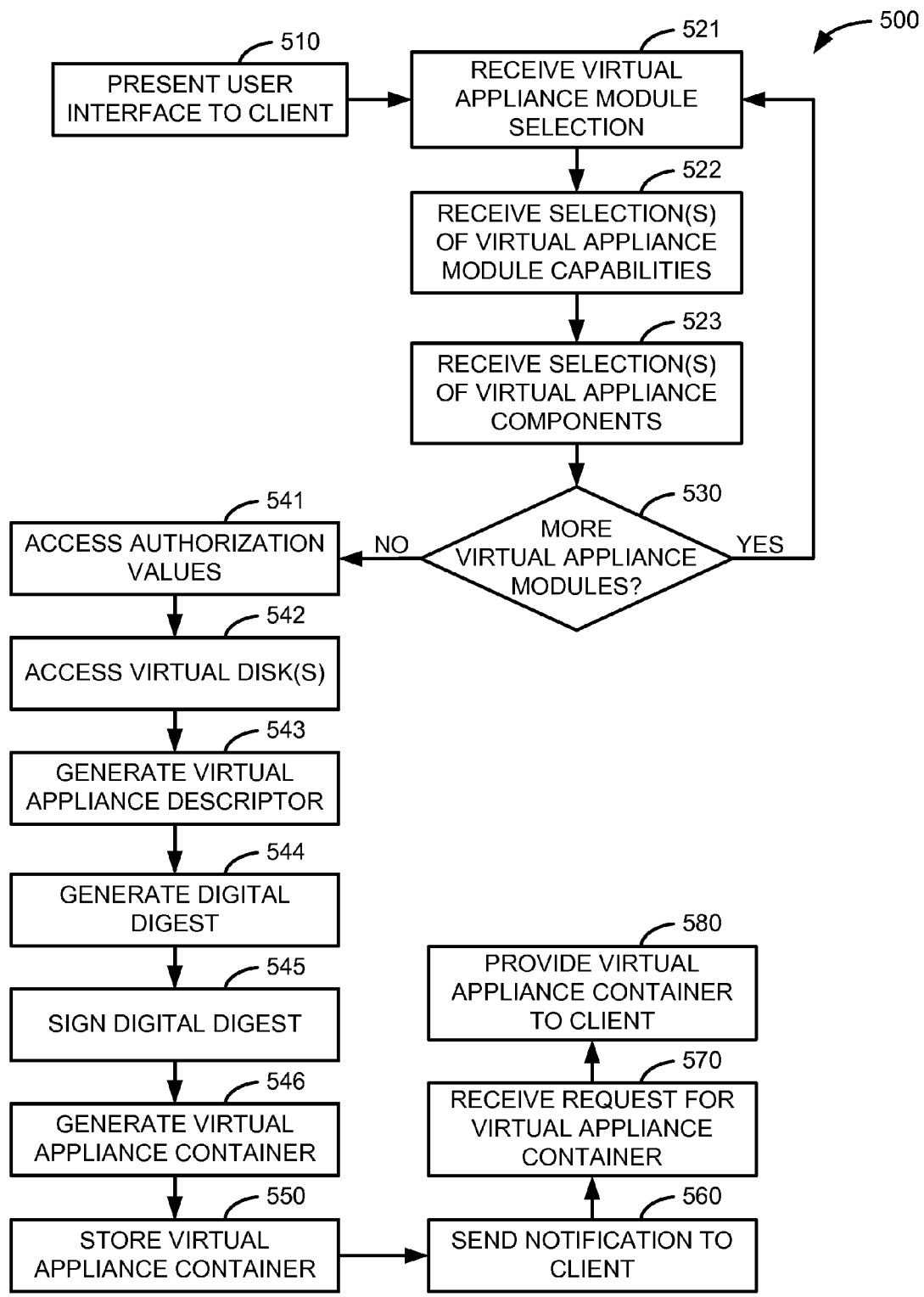
FIG. 5 is a flowchart of a process to generate a virtual appliance, according to an embodiment.

FIG. 5 is a flowchart of a process to generate a virtual appliance, according to an embodiment. Process 500 can be implemented as a hardware module, as a software module, and/or as a combination of a hardware module and a software module. For example, process 500 can be implemented as application-specific circuitry or as a software module including instructions stored at a memory and executed at a processor in communication with the memory. More specifically, for example, process 500 can be implemented at a virtual appliance generation system.

A user interface for selecting virtual appliance modules, virtual appliance components, capabilities, and/or options, attributes, parameters, and/or values of capabilities for virtual appliances is presented to a client at block 510. For example, as discussed above, a web page or a group of web pages can be presented by a web service to a client (or a user of a client) within a web browser hosted at the client. As a specific example, a web page including representations of a group of virtual appliance modules can be sent to a web browser by a web service in response to a request from the web browser for the web page based on, for example, a hyperlink of that web page.

The user can select a virtual appliance module by selecting (e.g., clicking on) the representation of that virtual appliance module within a view of the web browser and a selection identifier of the selected virtual appliance module is received at block 521. The selection identifier can be a URI, name, reference number, or other identifier of the virtual appliance module. A group of capabilities and options, attributes, parameters, and/or fields for values of the capabilities of the selected virtual appliance module are then accessed, for example, at a capability module of the virtual appliance generation system and displayed to the user. For example, a web page including check boxes, radio buttons, lists, and/or input fields related to capabilities and options, attributes and parameters, of the capabilities of the selected virtual appliance module can be sent to a web browser hosted at the client and displayed within the web browser to the client. The user can select (e.g., enable or disable) capabilities by selecting check boxes and/or radio buttons associates with the capabilities. Additionally, the user can specify values for options, attributes, and/or parameters of the capabilities by selecting values from lists or by entering values at input fields of the web page. The selection identifiers (e.g., values or states of check boxes and radio buttons and/or values of options, attributes, and/or parameters) of capabilities are received at block 522.

In addition to capabilities, virtual appliance components that are compatible with the selected virtual appliance module and capabilities can be displayed to the user and the user can select virtual appliance components for inclusion in the virtual appliance. For example, a web page including representations of virtual appliance components that are compatible with the selected virtual appliance module (e.g., the virtual appliance associated with the selection identifier received at block 521) and capabilities (e.g., capabilities associated with the selection identifiers received at block 522) can be sent to the a web browser at the client. Similar to the web page discussed above in relation to virtual appliance modules, the user can select one or more virtual appliance components and selection identifiers of the selected virtual appliance components are received at block 523. In some embodiments, virtual appliance components include capabilities similar to virtual appliance modules. These capabilities can be displayed to a user as discussed above in relation to capabilities of a virtual appliance module and selection identifiers of capabilities selected by the user and/or of the values specified or selected for options, attributes, and/or parameters of capabilities by the user can be received at the virtual appliance generation module.

After blocks 521, 522, and 523 are completed for a virtual appliance module, the user can provide an indication of whether more virtual appliance modules will be selected. For example, the virtual appliance generation system can send a web page to the user via which the user can specify whether more virtual appliance modules will be selected. The virtual appliance generation module can receive the indication at block 530 and can return to block 521 if an additional virtual appliance module will be selected. If no additional virtual appliance modules will be selected, at block 530 process 500 can proceed to block 541.

Authorization values for selected virtual appliance modules, virtual appliance components, and/or capabilities are accessed at block 541. As discussed above, authorization values can be accessed at a database or other data store including authorization values based on, for example, selection identifiers of virtual appliance modules, virtual appliance components, and/or capabilities received at blocks 521, 522, and/or 523. Alternatively, for example, authorization values can be requested from vendors of virtual appliance modules and/or virtual appliance components. For example, the virtual appliance generation system can send a request for a license key value (an authorization value) for a virtual appliance component to the vendor of that component to access the license key value.

In some embodiments, the virtual appliance generation system generates authorization values. For example, an authorization value can be generated using an algorithm specified by a vendor of a virtual appliance module, a software application of a virtual appliance module, and/or a vendor of a virtual appliance component. More specifically, for example, the virtual appliance generation module can generate a license key value that a software application within a virtual appliance component will accept as valid. In some embodiments, an authorization value can include values of options, attributes, and/or parameters of capabilities of a virtual appliance module (e.g., capabilities of a software application of the virtual appliance module) or of a virtual appliance component. For example, a flat text file or a hierarchical file such as, for example, an XML file including values of options, attributes, and/or parameters of capabilities can be encoded or encrypted at the virtual appliance generation system using an encoding or encryption process using a particular algorithm or key. The virtual appliance module (or the software application of the virtual appliance module) or component associated with those capabilities can decode or decrypt the file using the same or a complimentary algorithm or key to access the values of the options, attributes, and/or parameters.

The virtual disk images that are associated with the selected virtual appliance modules and/or virtual appliance components (e.g., the virtual disk images that store the instructions or codes that implement the functionalities or capabilities of the virtual appliance modules and/or virtual appliance components) are accessed at block 542. For example, the virtual disk images can be accessed at or retrieved from a data store or library of virtual appliance modules and/or virtual appliance components. A virtual appliance descriptor including information related to the selected virtual appliance module (e.g., software applications of the selected virtual appliance modules), virtual appliance components, and/or capabilities is generated at block 543. That is, a virtual appliance descriptor describes a configuration of a virtual appliance. For example, a virtual appliance descriptor includes information relation to enabled and/or disabled capabilities of a virtual appliance and/or virtual appliance components, values of options, attributes, and/or parameters of capabilities, which virtual appliance components are included within a virtual appliance, and/or or other configuration information.

As a specific example, the virtual appliance descriptor includes, for example, identifiers of the virtual disk images of the virtual appliance with which the virtual appliance descriptor is associated (i.e., the virtual disk images of the virtual appliance modules and virtual appliance components selected at blocks 521 and 523), authorization values, descriptions of software applications included within a virtual appliance module, descriptions of capabilities, values of options, attributes, and/or parameters of capabilities, and/or descriptions of virtual appliance components. As a specific example, the virtual appliance descriptor can conform to OVF.

In addition to information related to virtual appliance modules and virtual appliance components, a virtual appliance descriptor can include instructions or directives related to the configuration of a virtual operating platform that hosts the virtual appliance described by the virtual appliance descriptor. For example, the virtual appliance descriptor can include a directive specifying a transport medium and/or transport protocol (or transport directive) for providing the virtual appliance descriptor to the virtual appliance described by the virtual appliance descriptor when instantiated within a virtual operating platform. As an example, the transport directive can specify that that the virtual appliance descriptor (and, therefore, the information such as authorization values and descriptions of virtual appliance components) be mounted within a virtual operating platform as a read-only medium such as a virtual optical disk. More specifically, for example, the transport directive can specify that the virtual appliance descriptor be mounted as a virtual drive conforming to the ISO 9660 file system.

After the virtual appliance descriptor is generated at block 543, a digest of the virtual appliance descriptor and any virtual disk image identified in the virtual appliance descriptor is generated at block 545. The digest is a value or collection of values that are defined based on content (i.e., the bytes and/or bits of) the virtual appliance descriptor and virtual disk images. For example, as discussed above, the digest can be generated by applying a hash function to the virtual appliance descriptor and virtual disk images to generate a digest for each of the virtual appliance descriptor and virtual disk images. Each of the digital digest can be stored in a manifest file that will be included with the virtual appliance descriptor and virtual disk images within a virtual appliance container.

The digest is then signed at block 545 to identify the virtual appliance generation system as the entity or system that generated the digest. The digest can be signed, for example, by encrypting the digest using a private encryption key of a public/private encryption key pair associated with the virtual appliance generation system. A client of the virtual appliance generation system can later verify that the digest was generated by the virtual appliance generation system by generating another digest in the same manner the signed digest was generated and decrypt the signed digest using the public encryption key of the public/private encryption key pair that is associated with the virtual appliance generation system. If the decrypted digest and the digest generated by the client match (i.e., have a common value), the client can trust that the digest was generated by the virtual appliance generation system.

The virtual appliance descriptor, digest, and virtual disk images identified in the virtual appliance descriptor are then aggregated into or included within a virtual appliance container at block 546. As discussed above, a virtual appliance container is a package including the elements of a virtual appliance. The virtual appliance container is stored at a data store or repository at block 550 and a notification related to the availability of the virtual appliance container is sent to the user of the virtual appliance generation system at block 560. For example, an electronic message including a hyperlink or URI of the virtual appliance container or of a web page at which the virtual appliance container is accessible can be sent to the user.

The user can then send a request to access the virtual appliance container via, for example, a web browser. The request is received at block 570. As a specific example, an HTTP GET request is received from the client at a web service of the virtual appliance generation system at block 570. The virtual appliance container is provided to the client at block 580. For example, the virtual appliance container can be downloaded via a client such as a web browser. That is, the virtual appliance container can be made accessible to the client and/or sent to the client.

Process 500 can include blocks in addition to those illustrated in FIG. 5. Additionally, one or more blocks can be rearranged. For example, process 500 can include a block at which a virtual appliance generation system determines whether a selected virtual appliance component is compatible with a virtual appliance module and/or a capability (i.e., a capability of a virtual appliance module or a capability of a different virtual appliance component). A virtual appliance generation system can access compatibility information for the virtual appliance component, virtual appliance module, and/or capability to determine whether the virtual appliance component is compatible. Alternatively, for example, a virtual appliance generation system can determine whether the virtual appliance component is compatible based on a file type (e.g., of a software application of the virtual appliance component), dependency of the virtual appliance component (e.g., a software library accessed during execution of the virtual appliance component), or some other property or trait of the virtual appliance component. Furthermore, although process 500 is discussed with reference to an example environment including a virtual appliance generation system, process 500 is applicable within other environments.

Figure 6:
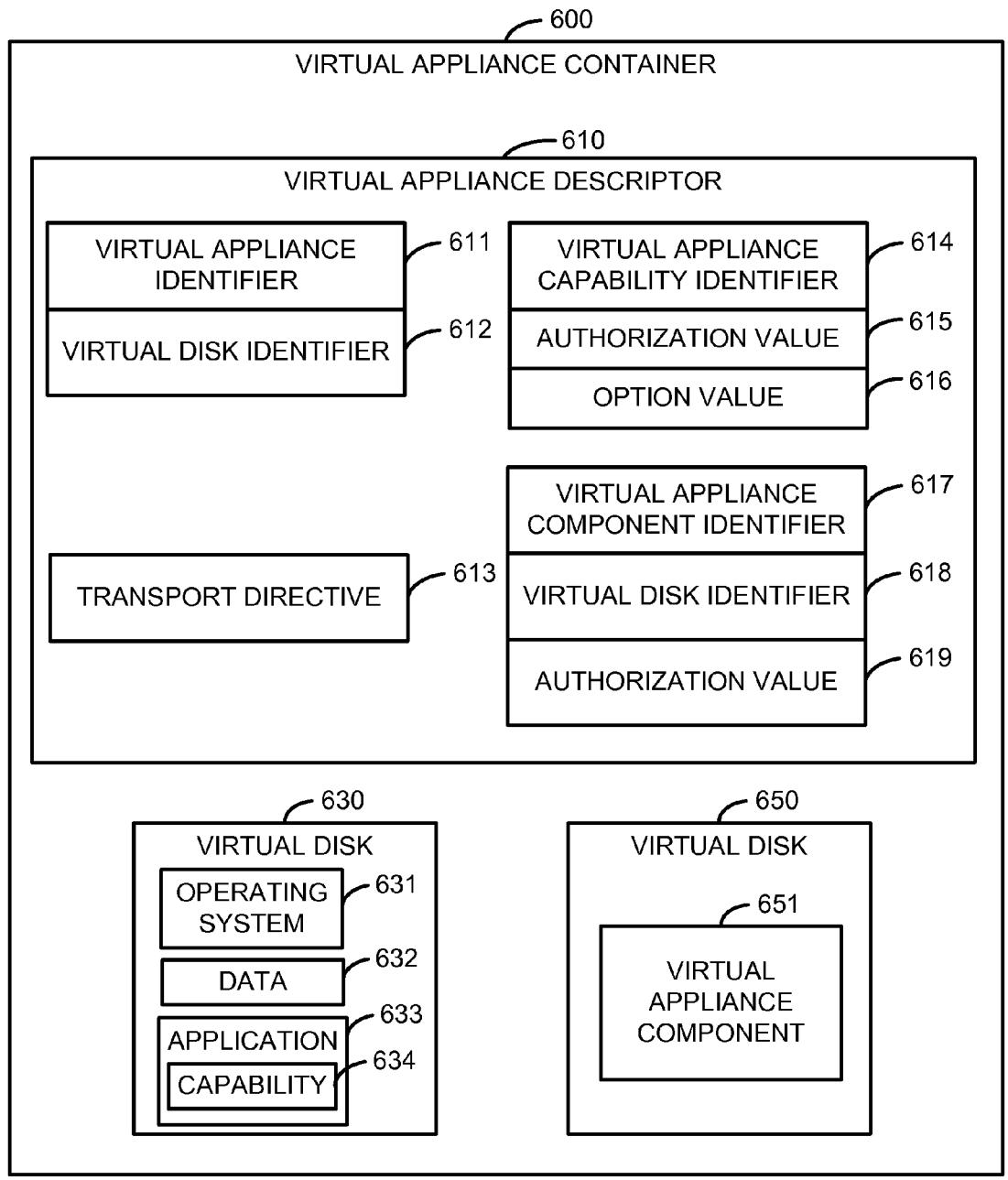
FIG. 6 is an illustration of a virtual appliance container, according to an embodiment.

FIG. 6 is an illustration of a virtual appliance container, according to an embodiment. Virtual appliance container 600 includes virtual appliance descriptor 610, virtual disk image 630 and virtual disk image 650. Virtual appliance descriptor 610 includes information related to a virtual appliance described by virtual appliance descriptor 610. For example, virtual appliance descriptor 610 includes virtual appliance identifier 611 and virtual disk image identifier 612. Virtual disk image identifier 612 includes an identifier or reference to virtual disk image 630 which includes operating system 631, data 632, and application 633 including capability 634. In other words, virtual disk image identifier 612 identifies a virtual disk image that includes the software stack (e.g., operating system 631) and a software module (e.g., application 633) to provide a service at a virtual appliance instantiated at a virtual operating platform.

Virtual appliance descriptor 610 also includes information related to capability 634. More specifically, virtual appliance capability identifier 614 identifies capability 634, and authorization value 615 included within virtual appliance descriptor 610 is an authorization value associated with capability 634. Thus, virtual appliance descriptor 610 includes an authorization value to enable or activate capability 634. In some embodiments, virtual appliance descriptor 610 includes values of options, attributes, or parameters of capability 634. For example, virtual appliance descriptor 610 includes option value 616 which is a value of an option of capability 634.

Information related to virtual appliance component 651 is also included at virtual appliance container 610. Virtual appliance component identifier 617 identifies virtual appliance component 651 and virtual disk image identifier 618 identifies virtual disk image 650 at which virtual appliance component 651 is stored. Furthermore, authorization value 619 is an authorization value that enables or activates virtual appliance component 651 (or one or more capabilities of virtual appliance component 651). In some embodiments, virtual appliance descriptor 610 includes values of options, attributes, or parameters of virtual appliance component 651 and/or capabilities of virtual appliance component 651.

Additionally, virtual appliance descriptor 610 includes transport directive 613 that specifies or identifies a transport medium and/or transport protocol for providing access to virtual appliance descriptor within a virtual appliance instantiated based on virtual appliance descriptor 610 at a virtual operating platform. In other words, transport directive 613 specifies the process or manner by which the information included within virtual appliance descriptor 610 can be accessed within the virtual appliance described (or defined) by virtual appliance container 600.

Figure 7:
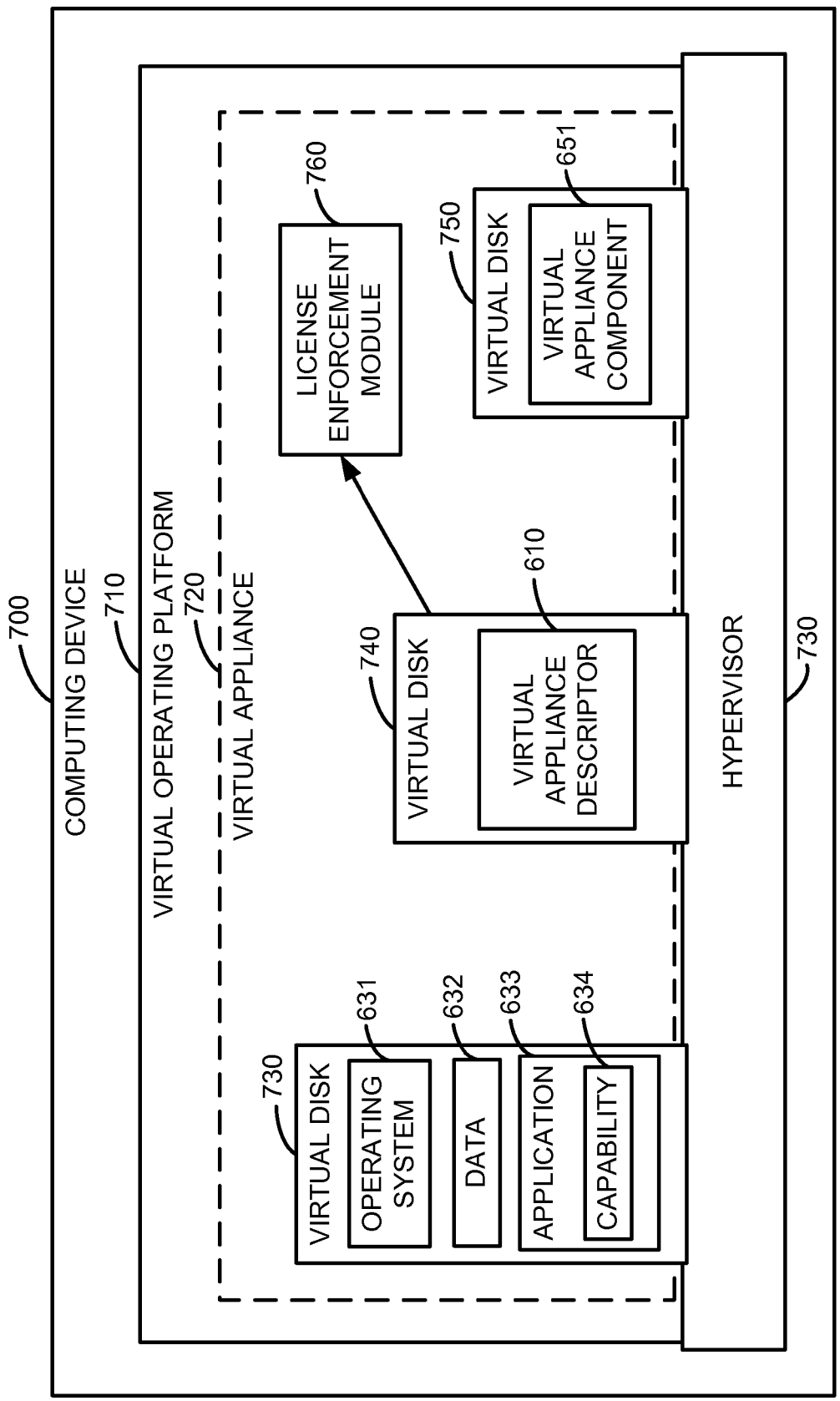
FIG. 7 is a schematic block diagram of a computing device including a hypervisor and a virtual appliance, according to an embodiment.

Virtual appliance container 600 can be instantiated as virtual appliance 720 at virtual operating platform 710 as illustrated in FIG. 7. FIG. 7 is a schematic block diagram of a computing device including a hypervisor and a virtual appliance, according to an embodiment. Computing device 700 hosts hypervisor 730 that is in communication with virtual operating platform 710. A virtual appliance container such as virtual appliance container 600 discussed above in relation to FIG. 6, is provided to hypervisor 730 and instantiated as virtual appliance 720. Virtual disk image 630 from virtual appliance container 600 is made available or mounted within virtual operating platform 710 as virtual disk 730 and operating system 631 is booted or initialized within virtual appliance 720. In other words, a virtual machine (or virtual machine instance) can be instantiated at computing device 700 based on virtual disk image 630. In other words, virtual disk 730 can be an element or component of a virtual machine.

Because virtual disk 730 is available within virtual operating platform 710, data 632 and application 633 including capability 634 are also available within virtual appliance 720. Additionally, virtual disk image 650 is made available or mounted within virtual operating platform 710 as virtual disk 750 and, thus, virtual appliance component 651 is accessible within virtual appliance 720. In some embodiments, a virtual machine (or virtual machine instance) is instantiated at computing device 700 based on virtual disk image 650 to host virtual appliance component 651. In other words, virtual disk 750 can be included within a virtual machine. Application 633 and virtual appliance component 651 can, therefore, be started, instantiated, or run to provide a service at virtual appliance 720.

Virtual appliance descriptor 610 is also accessible within virtual appliance 720 at virtual disk 740. In some embodiments, portions of virtual appliance descriptor 610 or virtual appliance container are available within as a file different from virtual appliance descriptor 610. For example, OVF provides an OVF environment file that includes information from a virtual appliance descriptor or virtual appliance container. In other words, as specified by OVF, a hypervisor interprets a virtual appliance descriptor and generates an OVF environment file if the virtual appliance descriptor is determined to be valid (e.g., that a digest of the virtual appliance descriptor and/or a related digital signature can be verified). Thus, virtual appliance descriptor 610 illustrated in FIG. 7 can be a virtual appliance descriptor, a portion of a virtual appliance descriptor, or a data set (e.g., a file) derived from a virtual appliance descriptor.

Virtual disk 740 is a transport medium that is specified by transport directive 613 of virtual appliance descriptor 610 within virtual appliance container 600. For example, virtual disk 740 can be a read-only virtual optical disk that is made available or mounted within virtual operating platform 710. Operating system 631, application 633, and/or virtual appliance component 651 when instantiated within virtual appliance 720 can access virtual appliance descriptor 610 to, for example, access authorization values and/or options, attributes, and parameters of capabilities. As a specific example, application 633 can access option value 616 of virtual appliance descriptor 610 at virtual disk 740 to configure capability 634. Thus, operating system 631, application 633, and/or virtual appliance component 651 can access configuration options, parameters, or arguments that were specified by a user of a virtual appliance generation system when virtual appliance container 600 was generated.

As discussed above, some capabilities of application 633 and/or virtual appliance component 651 such as capability 634 are configured to not operate or function without a valid authorization value. Because authorization values for authorized (or licensed) capabilities of application 633 and virtual appliance component 651 are stored within virtual appliance descriptor 610 at virtual disk 740, application 633 and/or virtual appliance component 651 can access those authorization values within virtual appliance 720 and determine whether particular capabilities are authorized.

In some embodiments, virtual appliance 720 includes enforcement module (or license enforcement module) 760. For example, enforcement module 760 can be included within operating system 631 or as a software application at virtual disk 730 that is instantiated within virtual appliance 720. Enforcement module 760 can access authorization values from virtual appliance descriptor 610 and provide those authorization values to software applications and/or virtual appliance components such as appliance 633 and virtual appliance component 651 that are instantiated within virtual appliance 720. This can be useful, for example, to prevent the authorization values from be accessible in a usable form within virtual appliance descriptor 610. More specifically, for example, license key values (authorization values) can be encrypted at a virtual appliance generation system before the license key values are stored within virtual appliance descriptor 610. Enforcement module 760 can include an encryption key to decrypt the license key values within virtual appliance 720 and provide the unencrypted license key values to, for example, virtual appliance component 651 and application 634. Thus, the license key values cannot be directly accessed at virtual appliance descriptor 610.

Some embodiments include a processor and a related processor-readable medium having instructions or computer code thereon for performing various processor-implemented operations. Such a processor can be a general-purpose processor or an application-specific process and can be implemented as a hardware module and/or a software module. A hardware module can be, for example, a microprocessor, a microcontroller, an application-specific integrated circuit ("ASIC"), a programmable logic device ("PLD") such as a field programmable gate array ("FPGA"), and/or other electronic circuits that perform operations. A software module can be, for example, instructions, commands, and/or codes stored at a memory and executed at another processor. Such a software module can be defined using one or more programming languages such as Java™, C++, C, an assembly language, a hardware description language, and/or another suitable programming language. For example, a processor can be a virtual operating platform hosted at a computer server including a microprocessor and a memory.

In some embodiments, a processor can include multiple processors. For example, a processor can be a microprocessor including multiple processing engines (e.g., computation, algorithmic or thread cores). As another example, a processor can be a computing device including multiple microprocessors with a shared clock, memory bus, input/output bus, and/or other shared resources. Furthermore, a processor can be a distributed processor. For example, a processor can include multiple computing devices, each including a processor, in communication one with another via a communications link such as a computer network.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and random-access memory ("RAM"). Examples of computer code include, but are not limited to, micro-code or micro-instructions, machine instructions, such as produced by a compiler, and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

Figure 8:
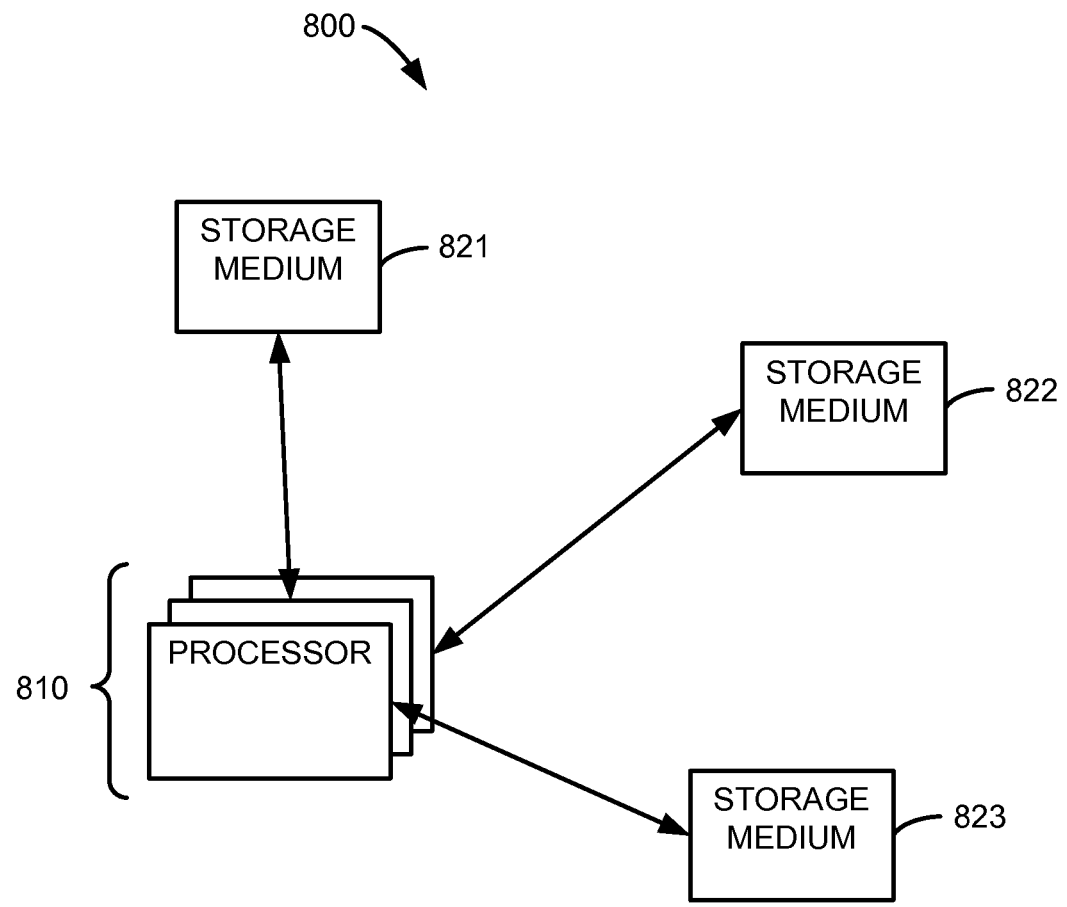
FIG. 8 is a schematic block diagram of a system including a processor and storage media, according to an embodiment.

As an example of a system including one or more processors and processor-readable storage media, FIG. 8 is a schematic block diagram of system 800 including a processor and storage media, according to an embodiment. As illustrated in FIG. 8, system 800 includes one or more processors 810 operatively coupled to storage medium 821, storage medium 822, and storage medium 823. One or more processors 810 can access instructions or code at storage medium 821, storage medium 822, and storage medium 823. Storage media 821, 822, and 823 can be any processor-readable media and/or related devices to access processor-readable media. For example, storage medium 821 can be a hard disk drive including a magnetic storage medium, storage medium 822 can be an optical drive such as a DVD drive and can accept DVD storage media on which processor-readable instructions can be stored, and storage medium 823 can be a FLASH memory drive with a Universal Serial Bus ("USB") interface. In some embodiments, storage media 821, 822, and/or 823 can be local to (e.g., coupled to a common computing device) one or more processors 810. In some embodiments, storage media 821, 822, and/or 823 can be remote from (e.g., coupled to a separate computing device) one or more processors 810 and in communication with one or more processors 810 via communications link. Furthermore, one or more of storage media 821, 822, and/or 823 can be local to one or more processors 810 and one or more of the remaining of storage media 821, 822, and/or 823 can be remote from one or more processors 810.

As a more specific example, one or more processors 810 can be included within a computing device having a hard disk drive represented by storage medium 821 and a DVD drive including DVD media represented by storage medium 822. The computing device can also include a USB host controller to communicate with a FLASH memory drive represented by storage medium 823. One or more processors 810 can access processor-readable instructions such as processor-readable instructions that implement an operating system, software application, and/or one or more processes at any of storage media 821, 822, and/or 823. Said differently, one or more processors 810 can interpret or execute instructions at processor-readable media via storage medium 821, storage medium 822, and/or storage medium 823. In some embodiments, system 800 can include one or more memories such as RAM that function as a cache between one or more of storage medium 821, storage medium 822, and/or storage medium 823 and one or more processors 810 for instructions or code stored (or accessible) at one or more of storage medium 821, storage medium 822, and/or storage medium 823.

While certain embodiments have been shown and described above, various changes in form and details may be made. For example, some features of embodiments that have been described in relation to one embodiment and/or process can be related to other embodiments. In other words, processes, features, and/or properties of various embodiments described in relation to one embodiment can be useful in other embodiments. Furthermore, it should be understood that the systems and methods described herein can include various combinations and/or sub-combinations of the components and/or features of the different embodiments described. As a specific example, embodiments discussed in relation to defining a virtual appliance container including a single virtual appliance module can be useful in defining a virtual appliance container including multiple virtual appliance modules. Thus, features described with reference to one or more embodiments can be combined with other embodiments described herein.

What is claimed is:

1. A non-transitory processor-readable medium storing code representing instructions to cause a processor to perform a process, the process comprising:
   sending to a client a plurality of virtual appliance component representations, each virtual appliance component representation from the plurality of virtual appliance component representations uniquely associated with a virtual appliance component from a plurality of virtual appliance components;
   accessing an authorization value associated with a selected virtual appliance component from the plurality of virtual appliance components based on an identifier of the selected virtual appliance component;
   storing an identifier of the selected virtual appliance component within a virtual appliance descriptor;
   storing the authorization value within the virtual appliance descriptor;
   generating a digest based on the virtual appliance descriptor;
   generating a virtual appliance container including a portion of a virtual appliance module, the selected virtual appliance component, the virtual appliance descriptor, and the digest; and
   providing the virtual appliance container to the client.

2. The processor-readable medium of claim 1, wherein the virtual appliance module is a selected virtual appliance module, and wherein the process further comprises:
   sending to the client a plurality of virtual appliance representations, each virtual appliance representation from the plurality of virtual appliance representations uniquely associated with a virtual appliance module from a plurality of virtual appliance modules, the plurality of virtual appliance modules including the selected virtual appliance module.

3. The processor-readable medium of claim 1, wherein the process further comprises:
   receiving the identifier of the selected virtual appliance component; and
   determining that the virtual appliance module is compatible with the selected virtual appliance component.

4. The processor-readable medium of claim 1, wherein the process further comprises:
   receiving a selection identifier of a capability of the virtual appliance module;
   accessing an authorization value associated with the capability;
   storing the identifier of the capability within the virtual appliance descriptor; and
   storing the authorization value associated with the capability within the virtual appliance descriptor.

5. The processor-readable medium of claim 1, wherein the process further comprises:
   generating a digital signature based on the digest, the virtual appliance container including the digital signature.

6. The processor-readable medium of claim 1, wherein the process further comprises:
   providing the virtual appliance container to a client in response to a request from the client for the virtual appliance container based on the reference to the virtual appliance container.

7. A method to define a virtual appliance, comprising:
   sending a representation of each capability from a plurality of capabilities of at least one virtual appliance module to a client via a communications link;
   receiving from the client via the communications link a selection identifier associated with a capability of a virtual appliance module from the at least one virtual appliance module;
   accessing an authorization value associated with the capability of the virtual appliance module in response to the receiving;
   storing an identifier of the capability of the virtual appliance module within a virtual appliance descriptor at a memory;
   storing the authorization value associated with the capability within the virtual appliance descriptor at the memory;
   generating a digest based on the virtual appliance descriptor;
   generating a virtual appliance container including a portion of the virtual appliance module, the virtual appliance descriptor, and the digest; and
   providing the virtual appliance container to the client.

8. The method of claim 7, further comprising:
   receiving a selection identifier associated with a virtual appliance component;
   determining that the virtual appliance module is compatible with the virtual appliance component;
   accessing an authorization value associated with the virtual appliance component; and
   storing the authorization value associated with the virtual appliance component within the virtual appliance descriptor, the virtual appliance container including the virtual appliance component.

9. The method of claim 7, wherein:
   the authorization value is a license key value; and
   the virtual appliance module includes a license enforcement module.

10. The method of claim 7, wherein:
    the authorization value is a license key value;
    the license key value is encrypted; and
    the virtual appliance module includes a license enforcement module configured to decrypt the license key value.

11. The method of claim 7, further comprising:
    receiving a payment confirmation associated with the capability of the virtual appliance before the accessing the authorization value.

12. The method of claim 7, further comprising:
sending to the client a reference to the virtual appliance container, the providing being in response to a request for the virtual appliance container from the client based on the reference.

13. The method of claim 7, wherein the virtual appliance module includes a license enforcement module, the method further comprising:
specifying a read-only transport medium to provide the authorization value to the license enforcement module.

14. The method of claim 7, further comprising:
generating a digital signature based on the digest, the virtual appliance container including the digital signature.

15. A virtual appliance generation system, comprising:
a virtual appliance module library; and
one or more processors, each including a hardware module, to implement a selection interface module to provide to a client a representation of each virtual appliance module from a plurality of virtual appliance modules and a representation of a capability of each virtual appliance module from the plurality of virtual appliance modules,
the virtual appliance module library in communication with the selection interface module to store the plurality of virtual appliance modules;
an authorization module to receive a selection identifier of a virtual appliance module from the plurality of virtual appliance modules, a selection identifier of the capability of the virtual appliance module, and an entitlement confirmation associated with the capability of the virtual appliance module, the authorization module operable to define an authorization value associated with the capability of the virtual appliance module;
an aggregation module to receive a portion of the virtual appliance module, an identifier of the capability of the virtual appliance module, and the authorization value,
the aggregation module operable to generate a digest based on the portion of the virtual appliance module, the authorization value, and the identifier of the capability of the virtual appliance module,
the aggregation module operable to generate a virtual appliance container including the portion of the virtual appliance module, the authorization value, the identifier of the capability of the virtual appliance module, and the digest; and
a virtual appliance distribution module in communication with the aggregation module to provide the virtual appliance container to the client.

16. The system of claim 15, wherein the virtual appliance distribution module is to receive a request from the client for the virtual appliance container and to provide the virtual appliance container to the client in response to the request.

17. The system of claim 15, wherein the selection interface module is operable to provide to the client a representation of each virtual appliance component from a plurality of virtual appliance components, each virtual appliance component from the plurality of virtual appliance components is compatible with at least one virtual appliance module from the plurality of virtual appliance modules.

18. The system of claim 15, further comprising:
a virtual appliance submission module in communication with the virtual appliance module library to receive the plurality of virtual appliance modules and store the plurality of virtual appliance modules at the virtual appliance module library.

19. The system of claim 15, wherein:
the selection interface module is operable to provide to the client a representation of each virtual appliance component from a plurality of virtual appliance components;
the authorization module is operable to receive a selection identifier of a virtual appliance component from the plurality of virtual appliance components and an entitlement confirmation associated with the virtual appliance component, the authorization module is operable to define an authorization value associated with the virtual appliance component; and
the aggregation module is operable to receive the virtual appliance component and the authorization value associated with the virtual appliance component, the virtual appliance container including the virtual appliance component and the authorization value associated with the virtual appliance component.

20. The system of claim 15, wherein:
the selection interface module is operable to provide to the client a representation of each virtual appliance component from a plurality of virtual appliance components,
the authorization module is operable to receive a selection identifier of a virtual appliance component from the plurality of virtual appliance components and an entitlement confirmation associated with the virtual appliance component, the authorization module is operable to define an authorization value associated with the virtual appliance component,
the aggregation module is operable to receive the virtual appliance component and the authorization value associated with the virtual appliance component, and
the virtual appliance container includes the virtual appliance component and the authorization value associated with the virtual appliance component,
the system further comprising:
a compatibility module operatively coupled to the selection interface module to determine that the virtual appliance module from the plurality of virtual appliance modules is compatible with the virtual appliance component from the plurality of virtual appliance components.

* * * * *